US010565088B2

(12) United States Patent  
Scherr

(10) Patent No.: US 10,565,088 B2  
(45) Date of Patent: Feb. 18, 2020

(54) MONITORING DEVICE FOR RECOVERING A STALLED BUS

(71) Applicant: Infineon Technologies AG, Neubiberg (DE)

(72) Inventor: Wolfgang Scherr, Villach (AT)

(73) Assignee: Infineon Technologies AG, Neubiberg (DE)

( * ) Notice: Subject to any disclaimer, the term of this patent is extended or adjusted under 35 U.S.C. 154(b) by 101 days.

(21) Appl. No.: 15/875,122

(22) Filed: Jan. 19, 2018

(65) Prior Publication Data

US 2019/0227896 A1 Jul. 25, 2019

(51) Int. Cl.
| | |
|---|---|
| *G06F 11/00* | (2006.01) |
| *G06F 11/34* | (2006.01) |
| *G06F 13/40* | (2006.01) |
| *G06F 13/42* | (2006.01) |
| *G06F 11/07* | (2006.01) |
| *G06F 11/30* | (2006.01) |

(52) U.S. Cl.
CPC ............ *G06F 11/349* (2013.01); *G06F 11/00* (2013.01); *G06F 11/076* (2013.01); *G06F 11/079* (2013.01); *G06F 11/0745* (2013.01); *G06F 11/0793* (2013.01); *G06F 11/3027* (2013.01); *G06F 13/4072* (2013.01); *G06F 13/4291* (2013.01); *G06F 2213/00* (2013.01)

(58) Field of Classification Search
CPC . G06F 11/0745; G06F 11/3466; G06F 11/349  
See application file for complete search history.

(56) References Cited

U.S. PATENT DOCUMENTS

| | | | | |
|---|---|---|---|---|
| 5,101,479 A | * | 3/1992 | Baker | G06F 13/4068 710/105 |
| 5,388,247 A | * | 2/1995 | Goodwin | G06F 9/383 711/136 |
| 9,442,794 B1 | * | 9/2016 | Tian | G06F 11/0778 |
| 2006/0136789 A1 | * | 6/2006 | Oshida | G06F 11/0745 714/43 |
| 2010/0115167 A1 | * | 5/2010 | Tardieux | G06F 13/362 710/240 |

OTHER PUBLICATIONS

Wikipedia, "I²C," https://en.wikipedia.org/wiki/I%C2%B2C, Dec. 5, 2017, 12 pages.

(Continued)

*Primary Examiner* — Charles Ehne  
(74) *Attorney, Agent, or Firm* — Harrity & Harrity, LLP

(57) ABSTRACT

According to some possible implementations, a monitoring device may receive a set of inputs from one or more drivers of a device connected to a bus. The one or more drivers may be capable of driving a bus line of the bus, and the bus may connect multiple devices capable of driving the bus line. The monitoring device may determine a length of time over which the set of inputs maintains a value indicating that the bus is not idle. The monitoring device may compare the length of time and a threshold. The monitoring device may output a signal based on comparing the length of time and the threshold.

20 Claims, 6 Drawing Sheets

(56) References Cited

OTHER PUBLICATIONS

Maxim Integrated Products, "Determining Clock Accuracy Requirements for UART Communications," https://pdfserv.maximintegrated.com/en/an/AN2141.pdf, Aug. 7, 2003, 9 pages.
Philips Semiconductors, "The I²C-bus and how to use it (including specifications)," https://www.datsi.fi.upm.es/docencia/Micro_C/i2c.pdf, Apr. 1995, 24 pages.
Infineon Technologies, "3D Magnetic Sensor," https://www.infineon.com/cms/de/product/sensor/magnetic position-sensor/3d-magnetic sensor/channel.html?channel=5546d4624c9e0f0e014c9e105a8a001c, 5 pages, Dec. 19, 2017 print date.
Melexis, "Triaxis® micropower magnetometer (magnetic field sensor)," https://www.melexis.com/en/product/MLX90393/Triaxis-Micropower-Magnetometer, 5 pages, Dec. 19, 2017 print date.

* cited by examiner

MONITORING DEVICE FOR RECOVERING A STALLED BUS

BACKGROUND

A bus may refer to a communication interface that transfers information between components of a system. A bus may include a hardware component, such as a wire, an optical fiber, and/or the like, and information may be communicated via the bus using a communication protocol. In some cases, a bus may include multiple bus lines that carry different types of information, such as a control line for carrying control information, a data line for carrying data, and/or the like.

SUMMARY

According to some possible implementations, a method may include receiving, by a monitoring device, a set of inputs from one or more drivers of a device connected to a bus. The one or more drivers may be capable of driving a bus line of the bus, and the bus may connect multiple devices capable of driving the bus line. The method may include determining, by the monitoring device, a length of time over which the set of inputs maintains a value indicating that the bus is not idle. The method may include comparing, by the monitoring device, the length of time and a threshold. The method may include outputting, by the monitoring device, a signal based on comparing the length of time and the threshold.

According to some possible implementations, a monitoring device may include a gate component, a counter component, and a comparator component. The gate component may receive input from one or more bus drivers of a device connected to a bus, where the one or more bus drivers are capable of driving the bus, and where the bus connects multiple devices capable of driving the bus. The gate component may output a signal that indicates whether the input includes a value indicating that the bus is not idle. The counter component may increment a counter value when the signal indicates that the input includes a value indicating that the bus is not idle, or may reset the counter value when the signal indicates that the input includes a value indicating that the bus is idle. The counter component may output the counter value. The comparator component may compare the counter value and a threshold value, and may output a comparison signal based on comparing the counter value and the threshold value, where the comparison signal indicates whether the bus is stalled.

According to some possible implementations, a system may include a bus that includes one or more bus lines; multiple devices, connected to the bus, that are capable of driving the one or more bus lines; and a monitoring device connected to a device of the multiple devices. The monitoring device may receive a set of inputs from a driver, of the device, capable of driving the one or more bus lines. The monitoring device may determine a counter value indicative of a length of time over which the set of inputs maintains a value indicating that the one or more bus lines are not idle. The monitoring device may compare the counter value and a threshold value, and may output a signal indicative of whether to disable one or more components of the device based on comparing the counter value and the threshold value.

DETAILED DESCRIPTION

The following detailed description of example implementations refers to the accompanying drawings. The same reference numbers in different drawings may identify the same or similar elements.

When a system includes multiple devices capable of driving a bus of the system (e.g., providing input to the bus, transferring information via the bus, and/or the like), one of the devices may stall the bus by keeping the bus active and preventing other devices from using the bus. In some cases, a master device may recover a stalled bus, such as by sending a particular sequence of bits (e.g., a pulse) via the bus. However, in some cases, this may not be possible, as described in more detail herein. Alternatively, the system may be monitored for a stalled bus at an application layer. However, this application layer monitoring may not work across a variety of stall scenarios and/or across a variety of systems. Some techniques and apparatuses described herein are capable of recovering a stalled bus across a wide variety of scenarios and systems, thereby improving system performance and availability.

Figure 1:
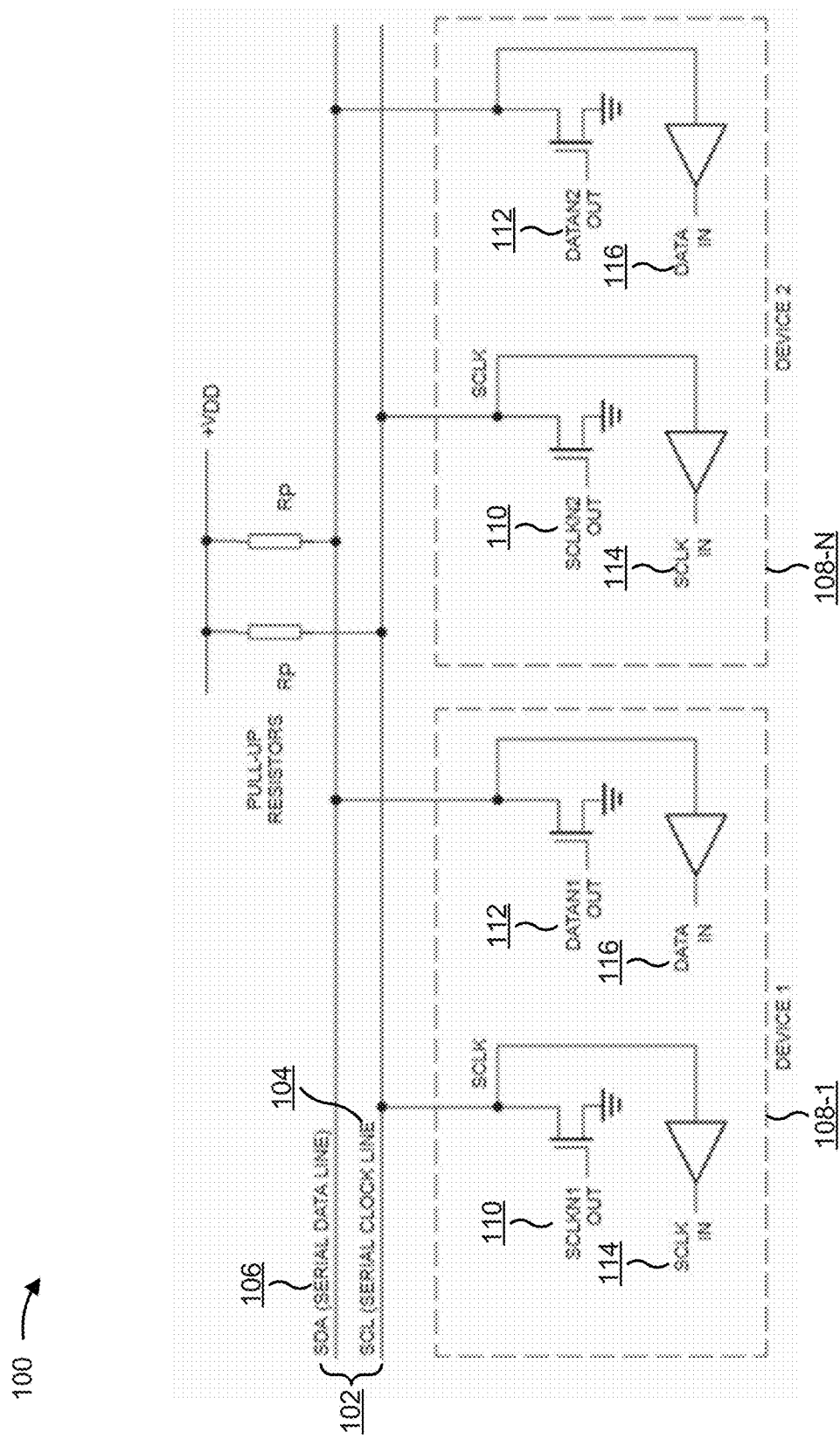
FIG. 1 is a diagram of an example system that includes multiple devices capable of driving a bus of the system, according to some implementations described herein.

FIG. 1 is a diagram of an example system 100 that includes multiple devices capable of driving a bus of the system 100, according to some implementations described herein.

As shown in FIG. 1, the system 100 may include a bus 102 that includes one or more bus lines. For example, the bus 102 may include a clock line 104, a data line 106, and/or the like. As further shown, the system 100 may include multiple devices 108-1 through 108-N (N≥2) (sometimes referred to individually as "device 108" and collectively as "devices 108"), which may include one or more master devices and/or one or more slave devices. The multiple devices 108 may each be capable of driving the bus 102. For example, the multiple devices 108 may include respective clock drivers 110 capable of driving the clock line 104, may include respective data drivers 112 capable of driving the data line 106, and/or the like. Additionally, or alternatively, the multiple devices 108 may include respective clock receivers 114 capable of receiving the output of the clock drivers 110, may include respective data receivers 116 capable of receiving the output of the data drivers 112, and/or the like.

Although the bus 102 of example system 100 is shown as having a clock line 104 and a data line 106, in some implementations, the bus 102 may include a single bus line, or may include a different combination of multiple bus lines than is shown in FIG. 1. Consequently, a device 108 may include a single bus driver to drive the bus 102 (e.g., when the bus 102 includes a single bus line), or may include a different combination of bus drivers to drive the bus 102

(e.g., when the bus 102 includes a different combination of multiple bus lines than is shown in FIG. 1). When the system 100 includes multiple devices 108 capable of driving the bus 102 (e.g., a bus 102 with a single bus line or multiple bus lines), one of the devices 108 may stall the bus 102 (e.g., by keeping the bus 102 active, by preventing the bus 102 from returning to an idle state, and/or the like), and may prevent other devices 108 from communicating via the bus 102. Additional details regarding stalling the bus 102 are described below in connection with FIGS. 2, 3A, and 3B.

As indicated above, FIG. 1 is provided as an example. Other examples are possible and may differ from what was described with regard to FIG. 1. For example, the number and arrangement of devices and/or components of system 100 shown in FIG. 1 are provided as an example. In practice, system 100 may include additional devices and/or components, fewer devices and/or components, different devices and/or components, or differently arranged devices and/or components than those shown in FIG. 1. Furthermore, two or more components shown in FIG. 1 may be implemented within a single component, or a single component shown in FIG. 1 may be implemented as multiple, distributed devices.

Figure 2:
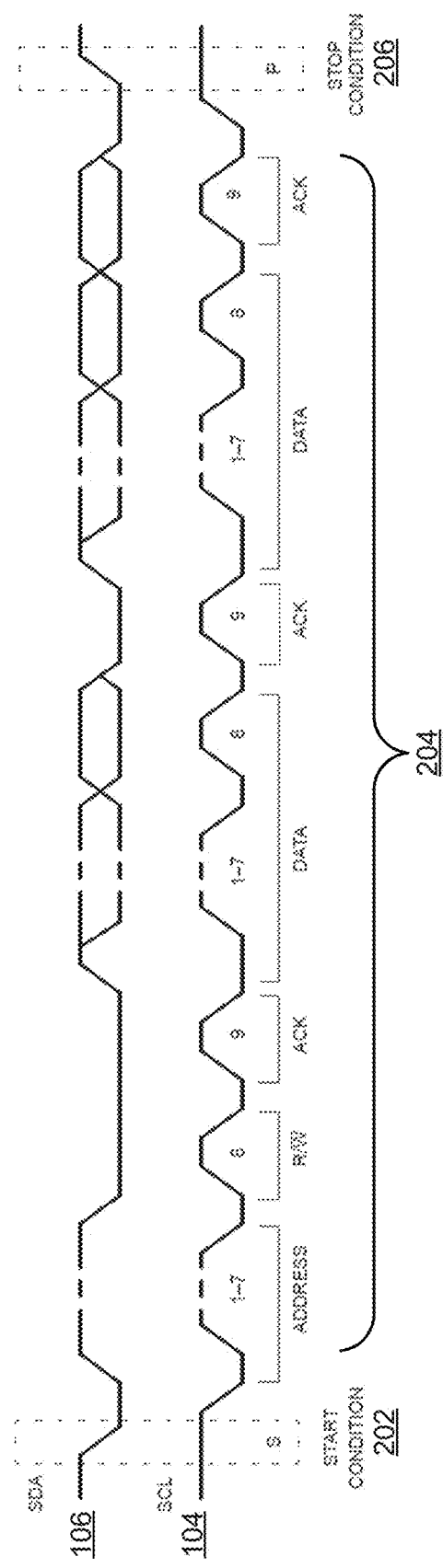
FIG. 2 is a diagram of an example of driving a bus of a system that includes multiple devices capable of driving the bus, according to some implementations described herein.

FIG. 2 is a diagram of an example 200 of driving a bus 102 of a system 100 that includes multiple devices 108 capable of driving the bus 102, according to some implementations described herein. While example 200 is an example of a Philips inter-integrated circuit (I2C) bus standard, other examples are possible.

As shown in FIG. 2, an example bus 102 may include a clock line 104 and a data line 106. In this case, the bus 102 may be in an idle state when both the clock line 104 and the data line 106 are in a high state (e.g., have been driven to a first logical state, such as driven to a logical one state).

As shown by reference number 202, a device 108 may indicate the start of a data transmission by driving the data line 106 to a low state (e.g., to a second logical state, such as a logical zero state) while the clock line 104 is in a high state. Thus, as shown, the condition of driving the data line 106 low while the clock line 104 is high may be referred to as a start condition.

As shown by reference number 204, the device 108 may then transmit data by driving the data line high or low to represent bits of ones or zeros. As further shown, the clock line 104 may be used for control information, such as addressing information, read/write indications, acknowledgements, and/or the like. Notably, a state of the data line 106 cannot be changed while the clock line 104 is high because this would signal a stop condition.

As shown by reference number 206, the device 108 may indicate the end of the transmission by driving the data line 106 high while the clock line 104 is high. Thus, as shown, the condition of driving the data line 106 high while the clock line 104 is high may be referred to as a stop condition. In this case, both the data line 106 and the clock line 104 are in the high state after the transmission ends, which places the bus 102 in an idle state and makes the bus 102 available for subsequent transmissions by the device 108 and/or transmissions by other devices 108.

FIG. 2 shows example transmissions on a bus 102 under normal operation. In some cases, a device 108 may stall the bus 102, as described below in connection with FIGS. 3A and 3B. As indicated above, FIG. 2 is provided as an example. Other examples are possible and may differ from what was described with regard to FIG. 2.

Figure 3A:
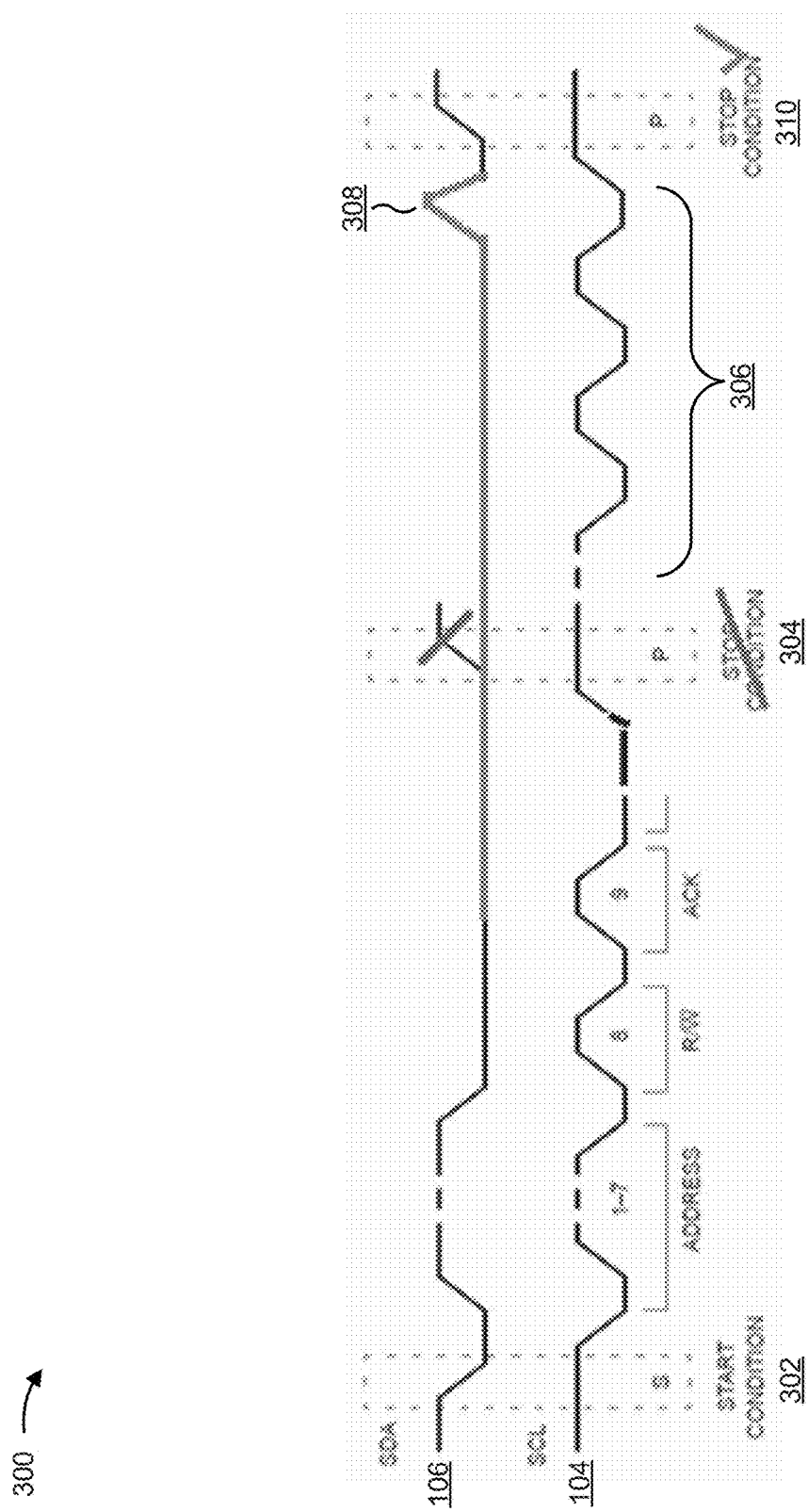
FIGS. 3A and 3B are diagrams of examples of stalling a bus of a system that includes multiple devices capable of driving the bus, according to some implementations described herein.
Figure 3B:
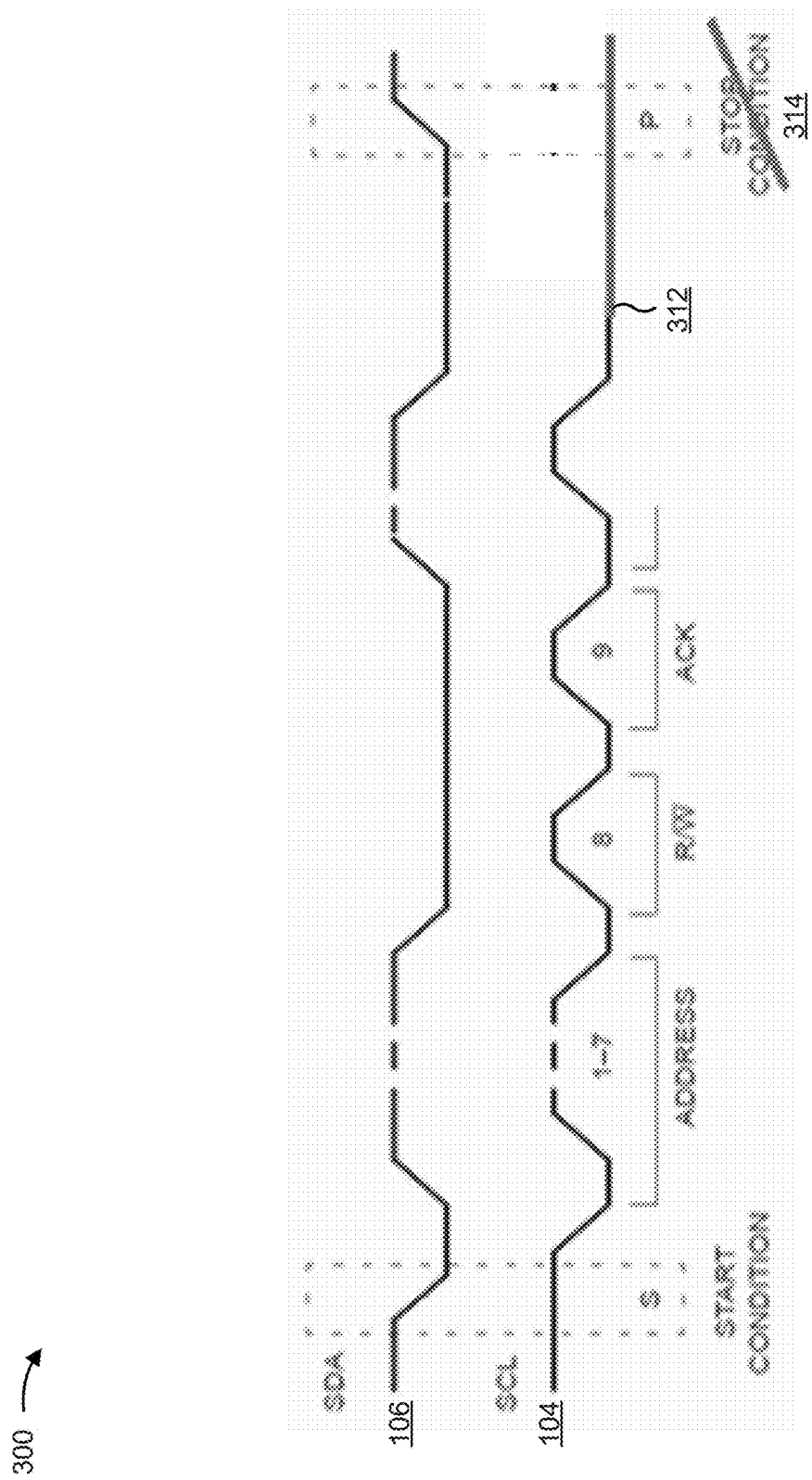

FIGS. 3A and 3B are diagrams of examples 300 of stalling a bus 102 of a system 100 that includes multiple devices 108 capable of driving the bus 102, according to some implementations described herein.

As shown in FIG. 3A, an example bus 102 may include a clock line 104 and a data line 106. In this case, the bus 102 may be in an idle state when both the clock line 104 and the data line 106 are in a high state, as described above in connection with FIG. 2. As shown by reference number 302, a device 108 may indicate the start of a data transmission by driving the data line 106 to a low state to indicate a start condition, as described above in connection with FIG. 2.

As shown by reference number 304, in some cases, an error may result in the data line 106 being stalled, where the data line 106 cannot change state. For example, and as shown, the data line 106 may be stalled in a low state. This may be due to an error associated with the device 108 that is driving the bus 102. In some cases, the device 108 driving the bus 102 may be a slave device, and a master device may detect and recover the stalled data line 106.

For example, as shown by reference number 306, in some cases, the master device may detect the stalled data line 106, and may recover the bus 102 by sending a series of pulses via the clock line 104 (e.g., to alternatingly drive the clock line 104 high and low, as shown). This may trigger the slave device to drive the data line 106 high, as shown by reference number 308. After recovering the data line 106, the transmission may be ended by driving the data line 106 high while the clock line 104 is high, as shown by reference number 310. However, sending a series of pulses via the clock line 104 may work to recover a stalled bus 102 only in some scenarios, such as when there are multiple bus lines, when there is a master device capable of controlling the clock line 104, or when the data line 106 (e.g., and not the clock line 104) is stalled. Furthermore, this recovery procedure may not be part of a protocol standard supported by a device 108 on the bus 102, which may prevent this recovery procedure from being used. For example, the master device may not be capable of sending clock pulses via the clock link 106 while keeping the data 104 line inactive.

For example, as shown in FIG. 3B, and by reference number 312, an error may result in the clock line 104 being stalled, where the clock line 104 cannot change state. For example, and as shown, the clock line 104 may be stalled in a low state due to an error associated with the device 108 that is driving the bus 102 (e.g., a protocol error, a soft error, an open drain defect, a driver error, a pre-driver error, an error in an interface or path, and/or the like). In this case, the master device cannot recover the bus 102 by sending a series of pulses via the clock line 104 since the clock line 104 is stalled. Some implementations described herein permit recovery from this stalled bus scenario (e.g., when the clock line 104 is stalled), as well as other stalled bus scenarios, such as when the data line 106 is stalled, when the bus 102 includes a single bus line that is stalled, and/or the like. In this way, some implementations described herein provide a monitoring device that is capable of recovering a stalled bus 102 in a variety of scenarios, thereby increasing flexibility and usefulness of the monitoring device, reducing design costs by permitting reuse of the monitoring device across multiple scenarios, and/or the like.

As indicated above, FIGS. 3A and 3B are provided as examples. Other examples are possible and may differ from what was described with regard to FIGS. 3A and 3B.

Figure 4:
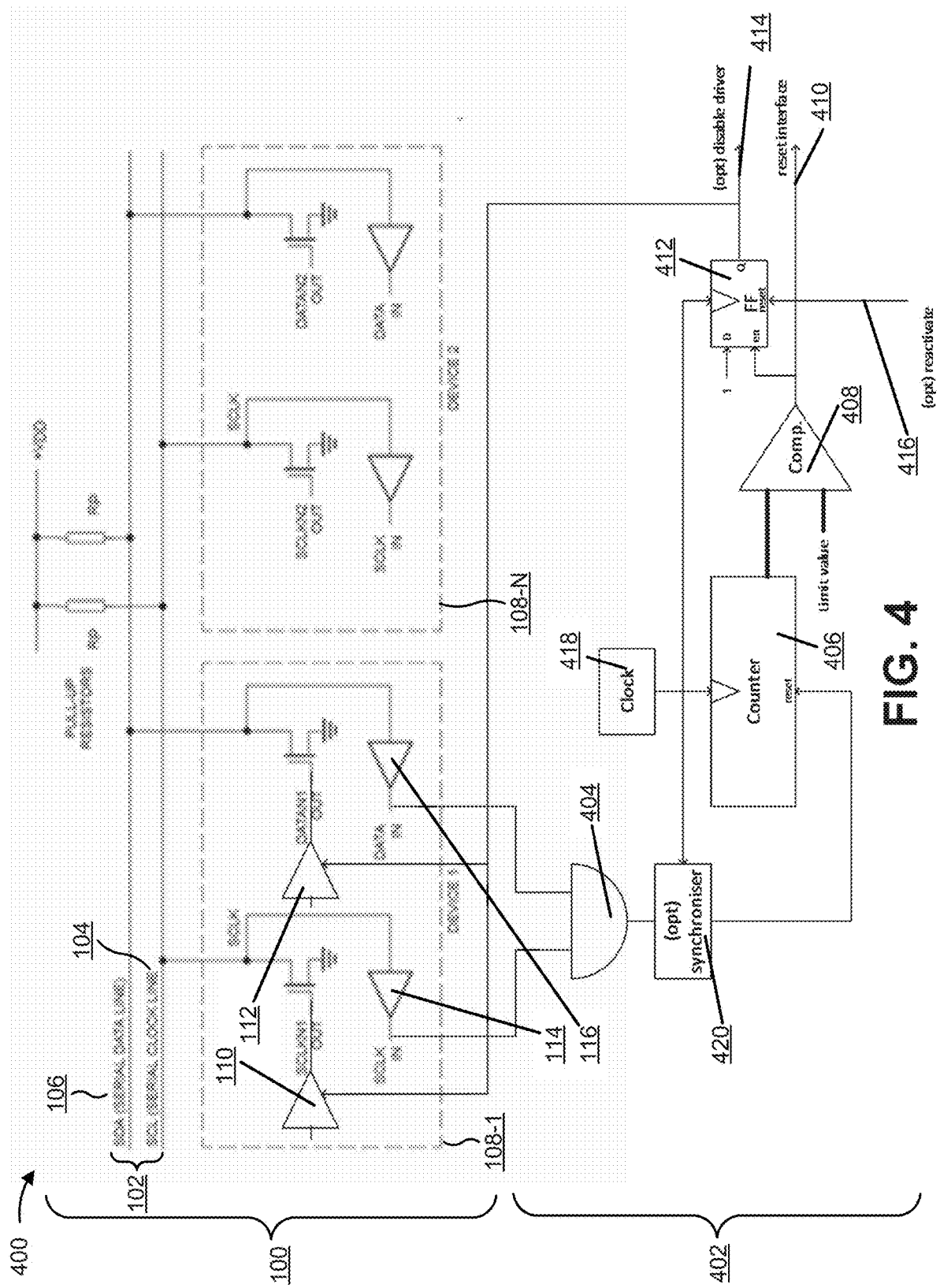
FIG. 4 is a diagram of an example system that includes a monitoring device for recovering a stalled bus of a system that includes multiple devices capable of driving the bus, according to some implementations described herein.

FIG. 4 is a diagram of an example system 400 that includes a monitoring device 402 for recovering a stalled bus 102 of a system 100 that includes multiple devices 108 capable of driving the bus 102, according to some implementations described herein.

As shown in FIG. 4, system 400 may include a system 100, described above in connection with FIG. 1. In some implementations, the system 100 may include a bus 102 with multiple bus lines, as shown. In some implementations, the system 100 may include a bus 102 with a single bus line. As some non-limiting examples, the system 100 may include an inter-integrated circuit (I2C), a serial peripheral interface (SPI), a universal asynchronous receiver-transmitter (UART), a serial companion interface, a pulse-code modulation (PCM) interface, a pulse-width modulation (PWM) interface, a short PWM code (SPC) interface, an SAE J2716 single edge nibble transmission (SENT) interface, an incremental interface (e.g., with or without direction information), a one-wire (1-wire) interface, a local interconnect network (LIN), a controlled area network (CAN), a peripheral sensor interface 5 (PSI5), and/or the like. In principle, any interface can be used providing any form of idle state which can be monitored.

As further shown, system 400 may include a monitoring device 402 in communication with a device 108. In some implementations, system 400 may include multiple monitoring devices 402 corresponding to the multiple devices 108 of system 100. In this case, each monitoring device 402 may communicate with a different device 108 of system 100. Additionally, or alternatively, the monitoring device 402 may be used in a system that includes a point-to point connection with a master device that includes a receiver and a slave device that includes a transmitter, and/or a master device that includes a transmitter and a slave device that includes a receiver, where the monitoring device 402 monitors the functionality (e.g., input) of the device 108 that includes the transmitter.

The monitoring device 402 may include a gate component 404. The gate component 404 may receive input from one or more bus drivers of a device 108 connected to a bus 102 of the system 100. For example, a gate component 404 may receive first input from a clock driver 110, may receive second input from a data driver 112, and/or the like. In some implementations, the gate component 404 may receive, as input, the output of the clock driver 110 (e.g., the output used to drive the clock line 104). The output of the clock driver 110 may be transmitted to a clock receiver 114, which may transmit the output to the gate component 404. Additionally, or alternatively, the gate component 404 may receive, as input, the output of the data driver 112 (e.g., the output used to drive the data line 106). The output of the data driver 112 may be transmitted to a data receiver 116, which may transmit the output to the gate component 404. In some implementations, the gate component 404 may receive a set of inputs, which may refer to a single input at a particular point in time (e.g., from a single bus driver), multiple inputs at a single point in time (e.g., from multiple bus drivers), or multiple inputs over a period of time (e.g., from a single bus driver or multiple bus drivers). In some implementations, the drivers 110, 112 and/or receivers 114,116 of the device 108 may be voltage-based with open-drain functionality as shown in system 400. Additionally, or alternatively, the drivers 110, 112 and/or receivers 114, 116 may use a push-pull interface with tristate functionality, may be current-based with current sources as drivers 110, 112 and current sinks as receivers 114, 116, or similar standards used for actual data transmission as single-ended or differential signals.

The gate component 404 may output a signal that indicates whether the input to the gate component 404 indicates that the bus is not idle (e.g., is in an active state, is not in an idle state, etc.). For example, if the system 100 includes a single bus line of the bus 102, the gate component 404 may output a first value (e.g., 0) if the bus line is active, and may output a second value (e.g., 1) if the bus line is idle. As another example, if the system 100 includes two bus lines, such as a clock line 104 and a data line 106, the gate component 404 may output a first value (e.g., 0) if either or both of the bus lines are in a first state (e.g., if both bus lines are low, indicating that the bus 102 is active, as described above in connection with FIGS. 2, 3A, and 3B), and may output a second value (e.g., 1) if both of the bus lines are in a second state (e.g., if both bus lines are high, indicating that the bus 102 is idle, as described above in connection with FIGS. 2, 3A, and 3B). In some implementations, the gate component 404 is an OR gate.

As further shown, the monitoring device 402 may include a counter component 406. The counter component 406 may receive the signal from the gate component 404, and may output a counter value based on the signal. In some implementations, the counter component 406 may increment a counter value when the signal from the gate component 404 indicates that the bus is not idle (e.g., is active). Additionally, or alternatively, the counter component 406 may reset the counter value when the signal from the gate component 404 indicates that the bus is idle. The counter component 406 may output the counter value (e.g., after each signal received from the gate component 404, after each increment, after a reset, and/or the like). In this way, the counter component 406 may use the counter value to indicate a length of time over which one or more bus drivers of a device 108 maintain the bus 102 in an active state (e.g., a length of time over which input from the gate component 404 maintains a value indicating that one or more bus lines are not idle), which may be indicative of a stalled bus 102.

As further shown, the monitoring device 402 may include a comparator component 408. The comparator component 408 may receive the counter value from the counter component 406, and may compare the counter value and a threshold value (shown as "limit value"). The threshold value may represent a length of time indicative of a stalled bus 102. For example, if the counter value is greater than or equal to the threshold, then this may indicate that the bus 102 has been active for a threshold amount of time, which may indicate that the bus 102 is stalled. The comparator component 408 may output a comparison signal based on comparing the counter value and the threshold value. The comparison signal may indicate whether the bus 102 is stalled. For example, the comparator component 408 may output a first value (e.g., 0) if the counter value does not satisfy the threshold (e.g., is less than or equal to the threshold), which may indicate that the bus 102 is not stalled. As another example, the comparator component 408 may output a second value (e.g., 1) if the counter value satisfies the threshold (e.g., is greater than or equal to the threshold), which may indicate that the bus 102 is stalled.

In some implementations, the system 400 and/or one or more devices 108 may be associated with a protocol, and the threshold value may be determined based on the protocol. Additionally, or alternatively, the threshold value may be configurable (e.g., based on the protocol). Additionally, or alternatively, the threshold value may be configured by the system 500 via a specific bus protocol to set the threshold value, by the actual protocol mode (e.g., which may indicate a threshold value), by on-chip configuration memory, and/or the like.

In some implementations, the monitoring device 402 may perform one or more actions to recover the stalled bus 102 when the comparison signal indicates that the bus 102 is stalled. For example, the monitoring device 402 may reset the device 108 (e.g., by powering off the device 108 and powering the device 108 back on within a threshold time period), may disable the device 108 (e.g., by powering off the device 108 without powering the device 108 back on within the threshold time period), may reset one or more bus drivers of the device 108 (e.g., a clock driver 110, a data driver 112, and/or the like), may disable one or more bus drivers of the device 108, may perform one or more diagnostic tests on the device 108 (e.g., to determine and/or resolve an error causing the stalled bus 102, to identify a bus driver causing the stalled bus 102, and/or the like), and/or the like. Additionally, or alternatively, the monitoring device 402 may reset or disable one or more components of the device 108, which may include resetting or disabling the device 108, resetting or disabling one or more bus drivers of the device 108, and/or resetting or disabling one or more other components of the device 108. In some implementations, the comparison signal may indicate that one or more of these actions are to be performed.

In some implementations, the monitoring device 402 may determine an action to be performed based on a quantity of times that the counter value satisfies the threshold value (e.g., a quantity of comparisons that indicate that the bus 102 is stalled). As an example, the monitoring device 402 may reset the device 108 the first time that the counter value satisfies the threshold, may disable a driver of the device 108 the second time that the counter value satisfies the threshold, and/or may disable the device 108 the third time that the counter value satisfies the threshold. In this way, the monitoring device 402 may attempt to resolve the error using less invasive actions, and may use more invasive actions if the less invasive actions fail to resolve the error.

As merely one example, and as shown by reference number 410, the monitoring device 402 may reset the device 108 (shown as "reset interface") each time that the comparison signal indicates that the bus 102 is stalled. Additionally, or alternatively, the monitoring device 402 may disable one or more bus drivers of the device 108 when the bus 102 has stalled a threshold number of times. For example, the monitoring device 402 may include a buffer 412 (e.g., a flip-flop component) that stores a count of a number of times that the bus 102 has stalled. As shown by reference number 414, the monitoring device 402 may disable one or more drivers of the device 108 when the bus 102 has stalled a threshold number of times. As shown by reference number 416, to reactivate the one or more drivers, the system 100 (e.g., a master device of the system 100) may provide input to reset the buffer 412 (e.g., after diagnosing and/or resolving an error causing the stalled bus 102).

As further shown, the monitoring device 402 may include a clock 418. In some implementations, the clock 418 may control the incrementing of the counter value by the counter component 406. For example, the counter component 406 may increment the counter value for each clock tick that the input from the gate component 404 indicates that the bus 102 is active. In some implementations, the clock 418 may be independent of a clock of the device 108, as shown. In this case, the monitoring device 402 may include a synchronization component 420 to synchronize the clock 418 of the monitoring device 402 and the clock of the device 108. In some implementations, the clock 418 may be included in the device 108. In this case, the monitoring device 402 may not include the synchronization component 420.

By using an independent monitoring device 402 that monitors signals of a device 108 of a system 100 that includes a bus 102 and multiple devices 108 capable of driving the bus 102, some implementations described herein permit recovery from a wide variety of scenarios leading to a stalled bus 102, such as when a clock line 104 of the bus 102 is stalled, when a data line 106 of the bus 102 is stalled, when the bus 102 includes a single bus line that is stalled, and/or the like. In this way, the flexibility and usefulness of the monitoring device 402 may be increased, and design costs may be reduced by eliminating the need for customized circuits to recover from different stalled bus scenarios. Furthermore, the monitoring device 402 can be implemented independently of the communication function of the device 108, which has advantages for functional safety (e.g., according to ISO26262 or other safety standards to be applied to the system 100) and allows implementation of the monitoring device 402 independently of any protocol used by the device 108 for communication.

The number and arrangement of devices and components shown in FIG. 4 are provided as an example. In practice, there may be additional devices and/or components, fewer devices and/or components, different devices and/or components, or differently arranged devices and/or components than those shown in FIG. 4. Furthermore, two or more components shown in FIG. 4 may be implemented within a single component, or a single component shown in FIG. 4 may be implemented as multiple, distributed components. Additionally, or alternatively, a set of components (e.g., one or more components) of monitoring device 402 may perform one or more functions described as being performed by another set of components of monitoring device 402.

Figure 5:
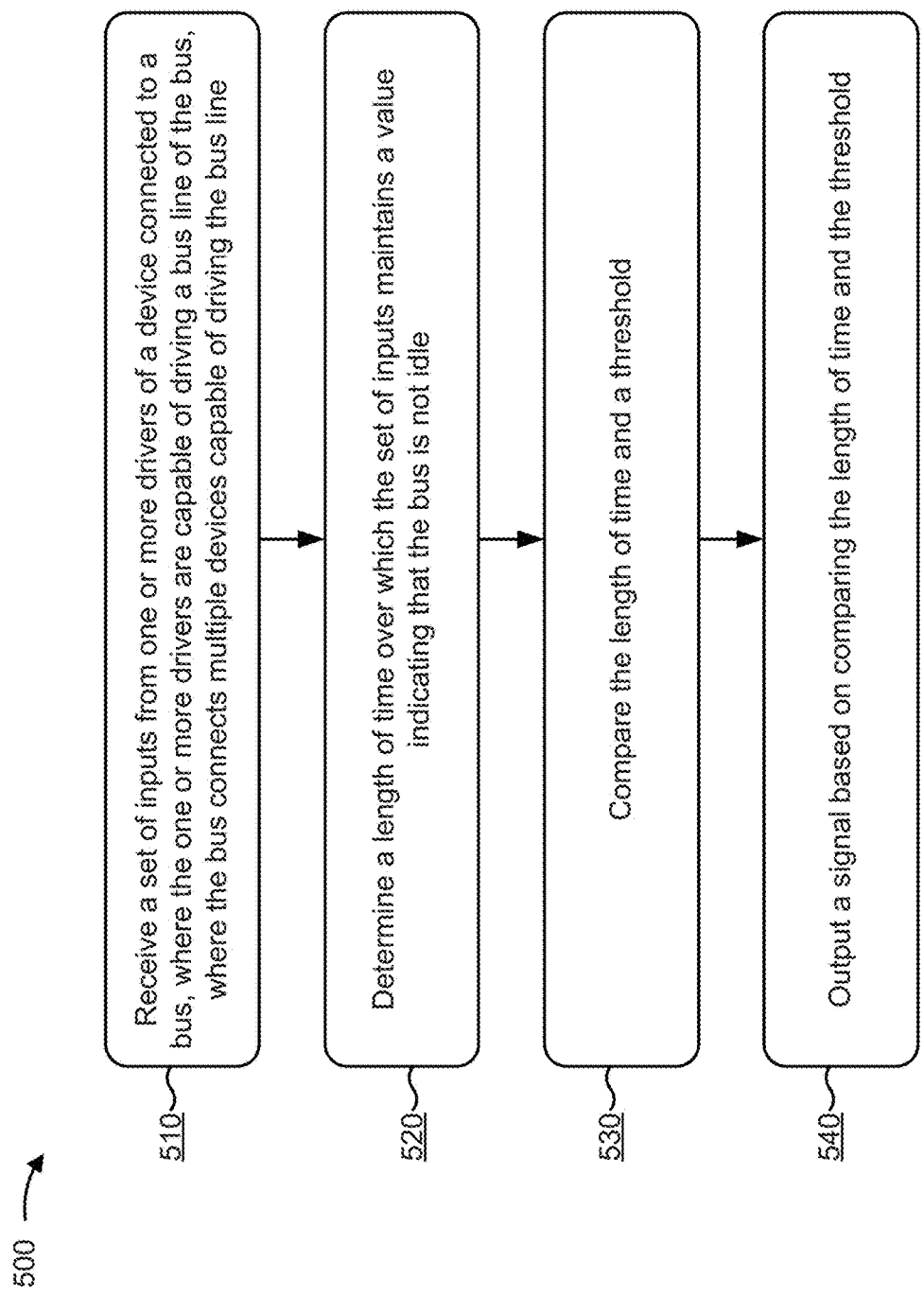
FIG. 5 is a flow chart of an example process for recovering a stalled bus of a system that includes multiple devices capable of driving the bus, according to some implementations described herein.

FIG. 5 is a flow chart of an example process 500 for recovering a stalled bus of a system that includes multiple devices capable of driving the bus, according to some implementations described herein. In some implementations, one or more process blocks of FIG. 5 may be performed by monitoring device 402.

As shown in FIG. 5, process 500 may include receiving a set of inputs from one or more drivers of a device connected to a bus, where the one or more drivers are capable of driving a bus line of the bus, and where the bus connects multiple devices capable of driving the bus line (block 510). For example, the monitoring device 402 may receive (e.g., using gate component 404) a set of inputs from one or more drivers (e.g., one or more bus drivers, such as clock driver 110, data driver 112, and/or the like) of a device 108 connected to a bus 102, as described above in connection with FIG. 4. In some implementations, the one or more drivers are capable of driving a bus line of the bus 102. In some implementations, the bus 102 connects multiple devices 108 capable of driving the bus line.

In some implementations, the bus line includes a clock line 104 and/or a data line 106. In some implementations, the one or more drivers includes a clock driver 110, capable of driving the clock line 104, and/or a data driver 112 capable of driving the data line 106. In some implementations, the set of inputs includes a first set of inputs from the clock driver 110 and/or a second set of inputs from the data driver 112.

In some implementations, a gate component 404 of the monitoring device 402 may receive input from one or more bus drivers of the device 108, and may output a signal that indicates whether the input includes a value indicating that the bus 102 is not idle. In some implementations, the gate component 404 may output the signal to a counter component 406.

As further shown in FIG. 5, process 500 may include determining a length of time over which the set of inputs maintains a value indicating that the bus is not idle (block 520). For example, the monitoring device 402 may determine (e.g., using counter component 406) a length of time over which the set of inputs maintains a value indicating that the bus 102 is not idle, as described above in connection with FIG. 4. In some implementations, the length of time is represented by a counter value.

In some implementations, a counter component 406 of monitoring device 402 may increment a counter value when a signal from the gate component 404 indicates that the input includes a value indicating that the bus 102 is not idle, or may reset the counter value when the signal indicates that the input includes a value indicating that the bus 102 is idle. In some implementations, the counter component 406 may output the counter value to a comparator component 408. In some implementations, a clock 418 may control incrementing of the counter value by the counter component 406. In some implementations, the clock 418 is included in the device 108. In some implementations, the clock 418 is independent of a clock of the device 108. In some implementations, the monitoring device 402 includes a synchronization component 420 to synchronize the clock 418 of the monitoring device 402 and the clock of the device 108.

As further shown in FIG. 5, process 500 may include comparing the length of time and a threshold (block 530), and outputting a signal based on comparing the length of time and the threshold (block 540). For example, the monitoring device 402 may compare (e.g., using comparator component 408) the length of time and a threshold. In some implementations, the comparator component 408 may receive a counter value from the counter component 406, and may compare the counter value and a threshold value.

In some implementations, the monitoring device 402 may output (e.g., using comparator component 408) a signal (e.g., a comparison signal) based on comparing the length of time and the threshold. In some implementations, the signal may indicate whether the bus 102 is stalled. Additionally, or alternatively, the signal may indicate whether to disable one or more components of the device 108. In some implementations, the one or more components include the one or more drivers. In some implementations, the signal indicates that the device 108 is to be reset. In some implementations, the signal indicates that one or more diagnostic tests are to be performed on the device 108.

In some implementations, the monitoring device 402 may perform an action on the device 108 based on a quantity of times that a comparison of the length of time and the threshold indicates an error associated with the device 108 (e.g., a stalled bus 102). In some implementations, the action includes at least one of: performing one or more diagnostic tests on the device 108, resetting the device 108, disabling the device 108, resetting the one or more drivers of the device 108, disabling the one or more drivers of the device 108, or some combination thereof.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

By using an independent monitoring device 402 that monitors signals of a device 108 of a system 100 that includes a bus 102 and multiple devices 108 capable of driving the bus 102, some implementations described herein permit recovery from a wide variety of scenarios leading to a stalled bus 102, such as when a clock line 104 of the bus 102 is stalled, when a data line 106 of the bus 102 is stalled, when the bus 102 includes a single bus line that is stalled, and/or the like. In this way, the flexibility and usefulness of the monitoring device 402 may be increased, and design costs may be reduced by eliminating the need for customized circuits to recover from different stalled bus scenarios.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a monitoring device, a set of inputs from one or more drivers of a device connected to a bus,
        where the one or more drivers are capable of driving a bus line of the bus,
        where the one or more drivers include at least one of:
            a clock driver capable of driving a clock line, or
            a data driver capable of driving a data line,
        where the bus connects multiple devices capable of driving the bus line,
        where the bus includes at least one of:
            the clock line, or
            the data line, and
        where the set of inputs include at least one of:
            an input from the clock driver, or
            an input from the data driver;

determining, by the monitoring device, a length of time over which the set of inputs maintains a value indicating that the bus is not idle;
comparing, by the monitoring device, the length of time and a threshold; and
outputting, by the monitoring device, a signal based on comparing the length of time and the threshold.

2. The method of claim 1, where the signal indicates whether to disable one or more components of the device.

3. The method of claim 2, where the one or more components include the one or more drivers.

4. The method of claim 1, where the signal indicates that the device is to be reset.

5. The method of claim 1, where the signal indicates that one or more diagnostic tests are to be performed on the device.

6. The method of claim 1, further comprising:
performing an action on the device based on a quantity of times that a comparison of the length of time and the threshold indicates an error associated with the device, where the action includes at least one of:
performing one or more diagnostic tests on the device,
resetting the device,
disabling the one or more drivers of the device, or
disabling the device.

7. The method of claim 1, where the length of time is represented by a counter value.

8. The method of claim 1, further comprising:
resetting the device at a first time when a comparison of the length of time and the threshold indicates an error associated with the device;
disabling the one or more drivers at a second time when the comparison of the length of time and the threshold indicates an error associated with the device; and
disabling the device at a third time when the comparison of the length of time and the threshold indicates an error associated with the device.

9. A monitoring device, comprising:
a gate component to:
receive a set of inputs from one or more bus drivers of a device connected to a bus,
where the one or more bus drivers are capable of driving the bus,
where the one or more bus drivers include at least one of:
a clock driver capable of driving a clock line, or
a data driver capable of driving a data line,
where the bus connects multiple devices capable of driving the bus,
where the bus includes at least one of:
the clock line, or
the data line, and
where the set of inputs include at least one of:
an input from the clock driver, or
an input from the data driver; and
output a signal that indicates whether the set of inputs include a value indicating that the bus is not idle;
a counter component to:
increment a counter value when the signal indicates that the set of inputs include a value indicating that the bus is not idle, or
reset the counter value when the signal indicates that the set of inputs a value indicating that the bus is idle; and
output the counter value; and
a comparator component to:
compare the counter value and a threshold value; and
output a comparison signal based on comparing the counter value and the threshold value,
where the comparison signal indicates whether the bus is stalled.

10. The monitoring device of claim 9, further comprising a clock to control incrementing the counter value by the counter component.

11. The monitoring device of claim 10, where another clock is included in the device.

12. The monitoring device of claim 10, where the clock is independent of a clock of the device.

13. The monitoring device of claim 12, further comprising a synchronization component to synchronize the clock of the monitoring device and the clock of the device.

14. The monitoring device of claim 9, where the comparison signal indicates that at least one of the device or the one or more bus drivers are to be reset or disabled.

15. The monitoring device of claim 9, where the device is to be reset each time the comparison signal indicates that the bus is stalled; and
where the one or more drivers is to be disabled based on the comparison signal indicating the bus has stalled for a threshold quantity of times.

16. A system, comprising:
a bus that includes one or more bus lines,
where the one or more bus lines include at least one of:
a clock line, or
a data line;
multiple devices, connected to the bus, that are capable of driving the one or more bus lines; and
a monitoring device, connected to a device of the multiple devices, to:
receive a set of inputs from one or more drivers, of the device, capable of driving the one or more bus lines,
where the one or more drivers include at least one of:
a clock driver capable of driving the clock line, or
a data driver capable of driving the data line, and
where the set of inputs include at least one of:
an input from the clock driver, or
an input from the data driver;
determine a counter value indicative of a length of time over which the set of inputs maintains a value indicating that the one or more bus lines are not idle;
compare the counter value and a threshold value; and
output a signal indicative of whether to disable one or more components of the device based on comparing the counter value and the threshold value.

17. The system of claim 16, where the system includes at least one of:
an inter-integrated circuit (I2C),
a serial peripheral interface (SPI),
a universal asynchronous receiver-transmitter (UART),
a serial companion interface,
a pulse-width modulation (PWM) interface,
a pulse-code modulation (PCM) interface,
an incremental interface,
a short PWM code (SPC) interface,
an SAE J2716 single edge nibble transmission (SENT) interface,
a one-wire (1-wire) interface,
a local interconnect network (LIN),
a controlled area network (CAN), or
a peripheral sensor interface 5 (PSI5).

18. The system of claim 16, where the signal indicates at least one of:
   that the device is to be disabled,
   that the device is to be reset, or
   that the driver is to be disabled.

19. The system of claim 16, where the signal indicates an action to be performed on the device based on a quantity of times that a comparison of the counter value and the threshold value indicates an error associated with the device,
   where the action includes at least one of:
      performing one or more diagnostic tests on the device,
      resetting the device,
      disabling the driver of the device, or
      disabling the device.

20. The system of claim 16, where the monitoring device is further to:
   reset the device based on the signal being output; and
   disable the device based on the signal being output a threshold quantity of times.

* * * * *